(12) United States Patent
Tinnakornsrisuphap et al.

(10) Patent No.: US 8,842,555 B2
(45) Date of Patent: Sep. 23, 2014

(54) METHODS AND SYSTEMS FOR ADAPTIVE ENCODING OF REAL-TIME INFORMATION IN PACKET-SWITCHED WIRELESS COMMUNICATION SYSTEMS

(75) Inventors: Peerapol Tinnakornsrisuphap, San Diego, CA (US); Christopher Gerard Lott, San Diego, CA (US); Guan-Ming Su, Greenbelt, MD (US)

(73) Assignee: Qualcomm Incorporated, San Diego, CA (US)

( * ) Notice: Subject to any disclaimer, the term of this patent is extended or adjusted under 35 U.S.C. 154(b) by 831 days.

(21) Appl. No.: 11/315,399

(22) Filed: Dec. 21, 2005

(65) Prior Publication Data

US 2007/0091815 A1 Apr. 26, 2007

Related U.S. Application Data

(60) Provisional application No. 60/729,017, filed on Oct. 21, 2005.

(51) Int. Cl.
| | |
|---|---|
| H04J 3/14 | (2006.01) |
| H04N 21/658 | (2011.01) |
| H04N 21/2383 | (2011.01) |
| H04N 21/24 | (2011.01) |
| H04N 21/6377 | (2011.01) |
| H04N 21/2662 | (2011.01) |
| H04N 21/414 | (2011.01) |
| H04L 29/06 | (2006.01) |

(52) U.S. Cl.
CPC .......... *H04N 21/6377* (2013.01); *H04L 65/608* (2013.01); *H04N 21/658* (2013.01); *H04L 65/80* (2013.01); *H04N 21/2383* (2013.01); *H04N 21/2402* (2013.01); *H04N 21/2662* (2013.01); *H04L 65/602* (2013.01); *H04N 21/41407* (2013.01)

USPC ................ 370/252; 370/395.21; 375/141

(58) Field of Classification Search
USPC ......... 370/252, 470, 506, 528, 229, 310, 352, 370/395.21, 516; 382/232; 375/295
See application file for complete search history.

(56) References Cited

U.S. PATENT DOCUMENTS

| 4,774,587 A | 9/1988 | Schmitt |
| 5,341,374 A | 8/1994 | Lewen et al. |

(Continued)

FOREIGN PATENT DOCUMENTS

| CN | 1272271 | 11/2000 |
| CN | 1273011 | 11/2000 |

(Continued)

OTHER PUBLICATIONS

Dynamic Power Headroom Threshold for Mobile Rate determination in CDMA Network, 2004 IEEE, pp. 2004-2408, vol. 4, Issue Date: May 17-19, 2004.*

(Continued)

*Primary Examiner* — Andrew Lai
*Assistant Examiner* — Leon Andrews
(74) *Attorney, Agent, or Firm* — Brent A. Boyd (57) ABSTRACT

In an embodiment, a rate-adaptation unit may be configured to receive local as well as end-to-end feedback information associated with data transmission (such as data delay, packet loss, transmit power headroom, channel condition; sector loading, the amount of buffered data, etc.) from a wireless access module in communication with wireless/wired networks, and adapt the real-time information encoding in accordance with such feedback information.

35 Claims, 8 Drawing Sheets

(56) References Cited

U.S. PATENT DOCUMENTS

| | | | |
|---|---|---|---|
| 5,367,523 A | 11/1994 | Chang et al. | |
| 5,541,919 A | 7/1996 | Yong et al. | |
| 5,550,589 A | 8/1996 | Shiojiri et al. | |
| 5,550,593 A | 8/1996 | Nakabayashi | |
| 5,621,840 A | 4/1997 | Kawamura et al. | |
| 5,768,533 A | 6/1998 | Ran | |
| 5,790,538 A | 8/1998 | Sugar | |
| 5,802,068 A | 9/1998 | Kudo | |
| 5,838,678 A | 11/1998 | Davis et al. | |
| 5,969,764 A | 10/1999 | Sun et al. | |
| 6,002,802 A | 12/1999 | Chujoh et al. | |
| 6,111,917 A | 8/2000 | Tomita et al. | |
| 6,154,489 A | 11/2000 | Kleider et al. | |
| 6,233,251 B1 | 5/2001 | Kurobe et al. | |
| 6,330,683 B1 * | 12/2001 | Jeddeloh | 713/401 |
| 6,389,034 B1 | 5/2002 | Guo et al. | |
| 6,396,956 B1 | 5/2002 | Ribas-Corbera et al. | |
| 6,404,776 B1 | 6/2002 | Voois et al. | |
| 6,421,387 B1 | 7/2002 | Rhee | |
| 6,487,316 B1 | 11/2002 | Fukunaga et al. | |
| 6,490,243 B1 | 12/2002 | Tanaka et al. | |
| 6,574,247 B1 * | 6/2003 | Baggen et al. | 370/528 |
| 6,587,437 B1 | 7/2003 | Lee et al. | |
| 6,629,318 B1 | 9/2003 | Radha et al. | |
| 6,633,609 B1 | 10/2003 | Ing et al. | |
| 6,694,469 B1 | 2/2004 | Jalali et al. | |
| 6,747,991 B1 | 6/2004 | Hemy et al. | |
| 6,862,298 B1 | 3/2005 | Smith et al. | |
| 6,865,374 B2 | 3/2005 | Kalluri | |
| 6,891,822 B1 | 5/2005 | Gubbi et al. | |
| 7,020,484 B2 | 3/2006 | Gholmieh et al. | |
| 7,023,915 B2 | 4/2006 | Pian et al. | |
| 7,051,358 B2 | 5/2006 | Hakenberg et al. | |
| 7,058,085 B2 | 6/2006 | Earnshaw et al. | |
| 7,068,086 B2 | 6/2006 | Takeda | |
| 7,092,355 B1 | 8/2006 | Duong-Van | |
| 7,193,966 B2 | 3/2007 | Gupta et al. | |
| 7,197,026 B2 | 3/2007 | Chen et al. | |
| 7,206,285 B2 | 4/2007 | Loguinov | |
| 7,242,668 B2 | 7/2007 | Kan et al. | |
| 7,269,139 B1 | 9/2007 | Williams, Jr. et al. | |
| 7,304,951 B2 | 12/2007 | Rhee | |
| 7,342,880 B2 | 3/2008 | Yanagihara et al. | |
| 7,342,901 B1 | 3/2008 | Zhang et al. | |
| 7,356,079 B2 | 4/2008 | Laksono et al. | |
| 7,359,324 B1 | 4/2008 | Ouellette et al. | |
| 7,369,497 B2 | 5/2008 | Naruse | |
| 7,369,517 B2 * | 5/2008 | Dillinger et al. | 370/310 |
| 7,433,408 B2 | 10/2008 | Hatano et al. | |
| 7,453,938 B2 | 11/2008 | Haskell et al. | |
| 7,483,378 B2 | 1/2009 | Chikamatsu | |
| 7,492,710 B2 | 2/2009 | Wadekar et al. | |
| 7,533,192 B2 | 5/2009 | Otsuka et al. | |
| 7,606,427 B2 | 10/2009 | Malayath et al. | |
| 7,668,096 B2 | 2/2010 | Ignatowski et al. | |
| 7,944,838 B2 | 5/2011 | Nakamura et al. | |
| 8,102,878 B2 | 1/2012 | Lee | |
| 8,437,255 B2 | 5/2013 | Jiang | |
| 2002/0007416 A1 | 1/2002 | Putzolu | |
| 2002/0031336 A1 | 3/2002 | Okada et al. | |
| 2002/0054578 A1 | 5/2002 | Zhang et al. | |
| 2002/0154640 A1 | 10/2002 | Wei | |
| 2002/0191544 A1 | 12/2002 | Cheng et al. | |
| 2002/0191722 A1 | 12/2002 | Naruse | |
| 2003/0012212 A1 | 1/2003 | Earnshaw et al. | |
| 2003/0026277 A1 | 2/2003 | Pate et al. | |
| 2003/0054769 A1 | 3/2003 | Kalluri | |
| 2003/0095594 A1 | 5/2003 | Laksono et al. | |
| 2003/0152032 A1 | 8/2003 | Yanagihara et al. | |
| 2003/0202528 A1 | 10/2003 | Eckberg | |
| 2004/0076118 A1 | 4/2004 | Ho et al. | |
| 2004/0240558 A1 | 12/2004 | Hatano et al. | |
| 2004/0252761 A1 | 12/2004 | Brown et al. | |
| 2005/0013244 A1 * | 1/2005 | Parlos | 370/229 |
| 2005/0013245 A1 | 1/2005 | Sreemanthula et al. | |
| 2005/0053038 A1 | 3/2005 | Kimura | |
| 2005/0117056 A1 | 6/2005 | Aprea et al. | |
| 2005/0152320 A1 * | 7/2005 | Marinier et al. | 370/338 |
| 2005/0175093 A1 | 8/2005 | Haskell et al. | |
| 2005/0207392 A1 | 9/2005 | Sivalingham et al. | |
| 2005/0207437 A1 | 9/2005 | Spitzer | |
| 2005/0210515 A1 | 9/2005 | Roh et al. | |
| 2005/0220116 A1 | 10/2005 | Ahn et al. | |
| 2005/0243846 A1 | 11/2005 | Mallila | |
| 2005/0249231 A1 | 11/2005 | Khan | |
| 2005/0254508 A1 | 11/2005 | Aksu et al. | |
| 2005/0259694 A1 | 11/2005 | Garudadri et al. | |
| 2005/0283809 A1 | 12/2005 | Kim | |
| 2006/0007958 A1 | 1/2006 | Kang et al. | |
| 2006/0013263 A1 | 1/2006 | Fellman | |
| 2006/0050743 A1 * | 3/2006 | Black et al. | 370/516 |
| 2006/0072832 A1 * | 4/2006 | Nemiroff et al. | 382/232 |
| 2006/0083243 A1 | 4/2006 | Igarashi et al. | |
| 2006/0256756 A1 * | 11/2006 | Wakabayashi | 370/335 |
| 2007/0019931 A1 | 1/2007 | Sirbu | |
| 2007/0041324 A1 | 2/2007 | Shenoi | |
| 2007/0071030 A1 | 3/2007 | Lee | |
| 2007/0091815 A1 | 4/2007 | Tinnakornsrisuphap et al. | |
| 2007/0091816 A1 | 4/2007 | Lee et al. | |
| 2007/0097257 A1 | 5/2007 | El-Maleh et al. | |
| 2007/0121706 A1 * | 5/2007 | Nakamura et al. | 375/141 |
| 2007/0201406 A1 | 8/2007 | Yoon et al. | |
| 2007/0291870 A1 * | 12/2007 | Ponnekanti | 375/295 |
| 2008/0056125 A1 | 3/2008 | Kneckt et al. | |
| 2008/0170500 A1 | 7/2008 | Ito et al. | |
| 2008/0205856 A1 | 8/2008 | Kim et al. | |
| 2009/0021572 A1 | 1/2009 | Garudadri et al. | |
| 2009/0028050 A1 | 1/2009 | Winter et al. | |
| 2009/0046743 A1 | 2/2009 | Hamanaka | |
| 2009/0180379 A1 | 7/2009 | Leung et al. | |
| 2010/0215053 A1 | 8/2010 | Chakareski et al. | |

FOREIGN PATENT DOCUMENTS

| | | |
|---|---|---|
| CN | 1293871 | 5/2001 |
| CN | 1674676 A | 9/2005 |
| EP | 1014739 | 6/2000 |
| EP | 1168732 | 1/2002 |
| EP | 1170957 | 1/2002 |
| EP | 1261163 | 11/2002 |
| EP | 1372304 | 12/2003 |
| EP | 1478137 | 11/2004 |
| EP | 1482681 | 12/2004 |
| EP | 1575225 | 9/2005 |
| EP | 1628446 A1 | 2/2006 |
| EP | 1641147 | 3/2006 |
| JP | 9130787 | 5/1997 |
| JP | 9214507 A | 8/1997 |
| JP | 10164533 A | 6/1998 |
| JP | 10303932 A | 11/1998 |
| JP | 10322673 A | 12/1998 |
| JP | 10341217 A | 12/1998 |
| JP | 11069349 A | 3/1999 |
| JP | 2000324171 A | 11/2000 |
| JP | 2001230809 | 8/2001 |
| JP | 2001236256 A | 8/2001 |
| JP | 2001517049 | 10/2001 |
| JP | 2002016929 A | 1/2002 |
| JP | 2002354141 | 12/2002 |
| JP | 2003209537 A | 7/2003 |
| JP | 2003244695 | 8/2003 |
| JP | 2004015761 A | 1/2004 |
| JP | 2004072720 A | 3/2004 |
| JP | 2004208001 A | 7/2004 |
| JP | 2004253883 A | 9/2004 |
| JP | 2004528769 A | 9/2004 |
| JP | 2004297186 A | 10/2004 |
| JP | 2004350227 A | 12/2004 |
| JP | 2004364277 A | 12/2004 |
| JP | 2004537203 A | 12/2004 |
| JP | 2005057323 A | 3/2005 |
| JP | 2005086304 A | 3/2005 |
| JP | 2005192073 A | 7/2005 |
| JP | 2005236783 A | 9/2005 |

(56) References Cited

FOREIGN PATENT DOCUMENTS

| | | |
|---|---|---|
| JP | 2005244908 A | 9/2005 |
| JP | 2005286832 A | 10/2005 |
| JP | 2005303925 A | 10/2005 |
| JP | 2006511124 A | 3/2006 |
| JP | 2006222822 A | 8/2006 |
| KR | 20020081521 A | 10/2002 |
| KR | 1020060046281 | 5/2006 |
| RU | 2161873 C2 | 1/2001 |
| RU | 2219671 | 12/2003 |
| RU | 2219682 C2 | 12/2003 |
| RU | 2002130511 | 3/2004 |
| RU | 2295833 C2 | 3/2007 |
| TW | I222296 | 10/2004 |
| WO | WO9823109 A2 | 5/1998 |
| WO | WO9914975 | 3/1999 |
| WO | 0018130 | 3/2000 |
| WO | WO0180477 | 10/2001 |
| WO | WO03001725 A1 | 1/2003 |
| WO | WO03026316 | 3/2003 |
| WO | WO03077462 A1 | 9/2003 |
| WO | 2004056028 | 7/2004 |
| WO | WO2004056123 A1 | 7/2004 |
| WO | 2004084503 | 9/2004 |
| WO | WO2004091130 A1 | 10/2004 |
| WO | WO2005004374 A2 | 1/2005 |
| WO | WO2005039209 A1 | 4/2005 |
| WO | WO2005122025 A2 | 12/2005 |
| WO | 2007051156 | 5/2007 |
| WO | WO2007119086 | 10/2007 |
| WO | WO2008024890 A2 | 2/2008 |

OTHER PUBLICATIONS

International Search Report—PCT/US06/060139—International Search Authority, European Patent Office—Apr. 17, 2007.
Written Opinion—PCT/US06/060139—International Search Authority, European Patent Office—Apr. 17, 2007.
International Preliminary Report on Patentability—PCT/US06/060139—The International Bureau of WIPO, Geneva, Switzerland—Apr. 23, 2008.
"Video Codec Test Model, Near-Term Version 8 (TMN8) Revision 1," ITU-T Telecommunication Standarization Sector of ITU, Geneva, CH, vol. Q15/16, Sep. 8, 1997, pp. 1-111, 1, XP001074663.
Fidler M, "Real-Time Multimedia Streams in a Differentiated Services Network," Computer Communications and Networks, 2001. Proceedings Tenth International Conference on Oct. 15-17, 2001. Piscataway, NJ, USA, IEEE, Oct. 15, 2001, pp. 380-385, XP010562121.
Hosein P et al: "Dynamic power headroom threshold for mobile rate determination in a CDMA network" Vehicular Technology Conference, 2004, VTC 2004-Spring 2004 IEEE May 17-19, 2004, pp. 2404-2408, XP010766590.
Kalavakunta R et al: "Evolution of mobile broadband access technologies and services consideration and solutions for smooth migration from 2G to 3G networks" Personal Wireless Communications, 2005, IICPWC 2005. 2005 IEEE International Conference on Jan. 23-25, 2005, pp. 144-149, xp010799046.
Kamel I et al.: "A Study on Scheduling Multiple Priority Requests in Multimedia Servers," Multimedia Computing and Systems, 1999. IEEE International Conference on Florance, Italy Jun. 7-11, 1999, Los Alamitos, CA, USA, IEEE comput. Soc., US, vol. 2, Jun. 7, 1999, pp. 395-399, XP010519422.
Keller R et al.: "An Active Router Architecture for Multicast Video Distribution," Infocom 2000. Nineteenth Annual joint Conference of the IEEE Computer and Communications Societies. Proceedings IEEE Tel Aviv, Israel Mar. 26-30, 2000, Piscataway, NJ, USA, pp. 1137-1146.
Lakshman T et al.: "The Drop from Front Strategy in TCP and in TCP over ATM," Proceedings of IEEE Infocom 1996. Conference on Computer Communications. Fifteenth Annual Joint Conference of the IEEE Computer and Communications Societies. Networking the Next Generation, Mar. 24-28, 1996, vol. 3, conf. 15, Mar. 24, 1996, pp. 1242-1250, XP000622260.
Meng-Huang Lee et al.: "A Predictable High-Throughput File System for Video Conference Recording," Systems, Man and Cybernetics, 1995. Inteiiigent Systems for the 21st Century, IEEE International Conference on Vancouver, BC, Canada Oct. 22-25, 1995, New York, vol. 5, Oct. 22, 1995, pp. 4296-4301, XP010195015.
Reininger D et al.: "VBR MPEG Video Coding with Dynamic Bandwidth Renegotiation," Communications-Gateway to Globalization. Proceedings of the Conference on Communications. Seattle, Jun. 18-22, 1995. ICC, New York, IEEE, US, vol. 3, Jun. 18, 1995, pp. 1773-1777.
Zhihai He et al.: "A Linear Source Model and a Unified Rate Control Algorithm for DCT Video Coding," IEEE Transactions on Circuits and Systems for Video Technology, IEEE Service Center, Piscataway, NJ, US, vol. 12, No. 11, Nov. 2002, pp. 970-982, XP011071890.
Zhihai He et al.: "Optimum Bit Allocation and Accurate Rate Control for Video Coding via rho-Domain Source Modeling," IEEE Transactions on Circuits and Systems for Video Technology, IEEE Service Center, Piscataway, NJ, US, vol. 12. No. 10, Oct. 2002, pp. 840-849, XP011071878.
3GPP2 C.S0024-A: "cdma2000 High rate Packet Data Air Interface Specification," version 1.0, p. 11-143, Mar. 2004.
ITU-T H.263 "Series: H Audiovisual and Multimedia Systems Infrastructure of Audiovisual services-Coding of Moving video—Video Coding for Low Bit Rate Communication," (Jan. 2005).
RFC 2190 C Zhu et al.: "RTP Payload Format for H.263 Video Streams," Network Working Group, pp. 1-12, Sep. 1997.
RFC 2429 C, Borman et al.: "RTP Payload Format for the 1998 Version of ITU-T Rec. H.263 Video (H.263+)" Network Working Group, pp. 1-17, Oct. 1998.
RFC 3016 Y. Kikuchi et al.: "RTP Payload Format for MPEG-4 Audio/Visual Streams," Network Working Group, pp. 1-21, Nov. 2000.
Myeong-Jin Lee et al.: "Video Frame Rate Control for Non-Guaranteed Network Services with Explicit Rate Feedback," Proceedings of Global Telecommunications Conference, pp. 293-297, 2000, XP002427548.
Text Description of Joint Model Reference Encoding Methods and Decoding Concealment Methods, Joint Video Team (JVT) of ISO/IEC MPEG and ITU-T VCEG Hong Kong, Jan. 2005. Sections 2.1.2.1.2, 2.1.3.1.1, 2.5, 3.1, 3.3.
"TIA/EIA/IS-856 CDMA2000 High Rate Packet Data Air Interface Specification," Apr. 2004.
3GPP TR 26.902 V1.0.0, "3rd Generation Partnership Project; Technical Specification Group Services and System Aspects; Video Codec Performance," (Release 7)(Mar. 2007).
3GPP TR 26.914, "Multimedia telphony over IP Multimedia Subsystem (IMS); Optimization opportunities" 2006.
3GPP TS 26.114 v1.2.0 (Dec. 13, 2006), "3rd Generation Partnership Project; Technical Specification Group Services and System Aspects-IP multimedia subsystem (IMS) multimedia telephony; media handling and interaction," (Release 7) TSG-SA4 internal working draft.
3GPP TS 34.108 v6.5.0, "3rd Generation Partnership Project; Technical Specification Group Radio Access Network Common test environment for UE conformance testing," (Release 6) (Dec. 2006).
3GPP2 C.R1008 v1.0, "cdma2000 Multimedia evaluation methodologies," Jan. 12, 2007.
3GPP2: "Packet Switched Video Telephony Services (PSVT/MCS)" 3GPP2, C.S0055-0, Version 1.0, Dec. 2007, XP002542622 p. 32, paragraph 8—p. 33.
D. Morikawa et al.: A feedback rate control of video stream in best-effort high-speed mobile packet network, The 5th Int. Symp. Wireless Personal Multimedia Comm., Oct. 27-30, 2002.
D. Singer et al., "A general mechanism for RTP Header Extensions," RFC 5285, IETF Internet Draft (Jul. 2008).
European Search Report—EP10187174, Search Authority—Munich Patent Office, Feb. 11, 2011.
G.Cheung et al., "Video transport over wireless networks," IEEE Trans. Multimedia, Aug. 2005 , pp. 777-785.

(56) References Cited

OTHER PUBLICATIONS

H. Schulzrinne et al., "RTP: A Transport Protocol for Real-Time Applications," IETF RFC 3550 (2003).
Hari Garudadri et al.: "Feedback Based Network Adaptive Source Coding for Packet Switched Multimedia Telephony," Qualcomm Inc.—PSVT: Feedback base rate control; version 0.6 May 26, Sep. 13, Sep. 19, 2006, pp. 1-9.
Harinath Garudadri et al.: "Rate Adaptation for Video Telephony in 3G Networks" Nov. 12-13, 2007, pp. 342-348.
I. Johansson et al., "Support for non-compound RTCP in RTCP AVPF profile, opportunities and consequences," IETF Internet Draft Dec. 20, 2006; Expires Jun. 23, 2007.
ISO/IEC 14496-2, International Standard, Information technology—Coding of audio-visual objects—Part 2: Visual, Third edition Jun. 1, 2004.
ITU-T H.264, Series H: Audiovisual and Multimedia System Infrastructure of audiovisual services, Coding of moving video, "Advanced video coding for generic audivisual services," Nov. 2007: 7.3.5.3 Residual Data Syntax; and 9.2 CALVLC parsing process.
"ITU-T Study Group 16, rate control for low-delay video communications," No. q15-A-20, 1997.
Kueh V Y H et al.: "Performance evaluation of SIP-based session establishment over satellite-UMTS" VTC 2003-Spring. The 57th IEEE Semiannual Vehicular Technology.
Conference Proceedings. Apr. 22-25, 2003, vol. 2, Apr. 22, 2003, pp. 1381-1385, XP010862.
Kyungran Kang et al: "Dynamic rate control mechanism for large scale sessions", Information Networking, 1998. (ICOIN-12), Proceedings. Twelfth International Conference on Tokyo, Japan, Jan. 21-23, 1998, Los Alamitos, CA, USA,IEEE Comput. Soc, US, Jan. 21, 1998, pp. 21-24, XP010265270, DOI : DOI:10.1109/ICOIN. 1998.648346 ISBN: 978-0-8186-7225-5.
Lei Z et al.: "Adaptive video transcoding and streaming over wireless channels" Journal of Systems & Software, vol. 75, No. 3, Mar. 1, 2005, pp. 253-270, XP004656968.
Lu, X; et. al: "Understanding video quality and its use in feedback control" Packet Video 2002, Pittsburgh,PA USA 2002.
Masoud Khansari et al: "Low Bit-Rate Video Transmission over Fading Channels for Wireless Microcellular Systems", IEEE Transactions on Circuits and Systems for Video Technology, IEEE Service Center, Piscataway, NJ, US, vol. 6, No. 1, Feb. 1, 1996, XP011014283, ISSN: 1051-8215.
Ott Helsinki University of Technology S Wenger Nokia N Sato Oki C Burmeister J Rey Matsushita J: "Extended RTP Profile for Real-time Transport Control Protocol (RTCP)-Based Feedback (RTP/AVPF); rfc4585.txt" IETF Standard, Internet Engineering Task Force, IETF, CH, Jul. 1, 2006, XP015055018 ISSN: 0000-0003 abstract p. 31, paragraph 6—p. 41.
Ruiz, P. et el.: "Adaptive Multimedia Applications to Improve User-perceived QoS in Multihop Wireless Al hoc Networks," Proceedings of the IEEE Int-rnation-1 Conference on Wireless Lane and Horne Networks (1CWLHN 2002) Online] Aug. 2002, pp. 673-684, XP002466712.
Stockhammer T: "Progressive video transmission for packet lossy channels exploiting feedback and unequal erasure protection", International Conference on Image Processing (ICIP), vol. 2, Sep. 22, 2002, pp. 169-172, XP010607935, ISBN: 978-0-7803-7622-9.
Technical Specification Group Radio Access Network: "3GPP TR25. 848 V4.0.0 Physical Layer Aspects of Utra High Speed Downlink Packet Access (Release 4)" 3GPP TR 25.848 V4.0.0, Mar. 2001, pp. 1-89, XP002189517.
Translation of Korean application 2008-7029470 corresponding to U.S. Appl. No. 11/445,099, citing KR2005-45667 (KR pub KR20060046281) dated Apr. 30, 2010 (060767KR).
Translation of Office Action in Chinese application 200680046657.5 corresponding to U.S. Appl. No. 11/315,399, citing US20030152032, CN1272271, WO2004056028, EP1170957 and EP1168732 dated Mar. 16, 2011.
T.V. Lakshman et al.: "Transporting compressed video over ATM networks with explicit-rate feedback control," IEEE Trans. Networking, Oct. 1999, vol. 7, No. 5, pp. 710-723.
T.V. Lakshman et al.: "VBR Video: Tradeoffs and Potentials", Proceeding of the IEEE, May 1998, vol. 86, No. 5, pp. 952-973.
"Universal Mobile Telecommunications System (UMTS); Radio Link Control (RLC) Protocol Specification (3GPP TS 25.322 version 6.9.0 Release 6); ETSI TS 125.322" ETSI Standards, LIS, vol. 3-R2, No. v6.9.0, Sep. 1, 2006, XP014035577.
Y.-G. Kim et al.: "TCP-frendly internet video with smooth and fast rate adaption and networks-aware error control," IEEE Trans. Circ. Sys. Vid. Tech., Feb. 2004, vol. 14, No. 2, pp. 256-268.
3GPP S4-060613 "MTSI Dynamic Video Rate Adaptation", Nov. 2006, pp. 1-9.
3GPP TS 26.234 v.7.1.0 (Dec. 2012), 3rd Generation Partnership Project; Technical Specification Group Services and System Aspects; Transparent end-to-end Packet-switched Streaming Service (PSS); Protocols and codecs (Release 7) pp. 35-39, 41-42, and 49-52.
"Simulation Results for MTSI Dynamic Video Adaptation Signalling", 3GPP TSG-SA WG4 #42 S4-070056, Jan. 29, 2007, pp. 1-12.
Qun-Hua, Wang et al., "The Application of a Sample TCP-friendly Congestion/Rate Control Arithmetic on Multimedia Teaching System", Computer and Information Technology, Apr. 30, 2007, pp. 28-30, vol. 15 No. 2.
Translation of Office Action in Chinese Application No. 200980101850.8, corresponding to U.S. Appl. No. 12/331,234, citing Qun-Hua, Wang et al., "The Application of a Simple TCP-Friendly Congestion/Rate Arithmetic on Multimedia Teaching Systems", Computer and Information Technology, Apr. 30, 2007, pp. 28-30, vol. 15 No. 2, dated Jan. 28, 2013.
Taiwan Search Report—TW099134270—TIPO—Feb. 14, 2014.

\* cited by examiner

METHODS AND SYSTEMS FOR ADAPTIVE ENCODING OF REAL-TIME INFORMATION IN PACKET-SWITCHED WIRELESS COMMUNICATION SYSTEMS

CLAIM OF PRIORITY 35 U.S.C. §119

The present Application for Patent claims priority to Provisional Application No. 60/729,017, entitled "METHODS AND SYSTEMS FOR ADAPTIVE REAL-TIME INFORMATION ENCODING IN WIRELESS COMMUNICATIONS," filed Oct. 21, 2005, and assigned to the assignee hereof and hereby expressly incorporated by reference herein.

BACKGROUND

1. Field

This disclosure relates generally to wireless communications. More specifically, embodiments disclosed herein relate to providing adaptive encoding of real-time information in packet-switched wireless communication systems.

2. Background

Wireless communication systems are widely deployed to provide various types of communications (such as voice and data) to multiple users. Such systems may be based on code division multiple access (CDMA), time division multiple access (TDMA), frequency division multiple access (FDMA), or other multiple access techniques. A wireless communication system may be designed to implement one or more standards, such as IS-95, cdma2000, IS-856, WCDMA, TD-SCDMA, and other standards.

As the demand for multimedia services (e.g., real-time video and audio, wireless gaming, and other multimedia data) in wireless communication systems grows, there lies a challenge to provide efficient and high quality multimedia services.

DETAILED DESCRIPTION

Adaptive real-time multimedia sources (e.g., video telephony (VT)) are still in their early infancy in today's wireless environment, e.g., compared with their counterpart in a wireline (such as the Internet) environment. In a WCDMA system, for example, the current approach is to encode all video frames to fit within a specified bandwidth or bitrate. In light of varying complexity invariably associated with different video sequences, a fixed bitrate may be unnecessarily high for some video sequences and thus does not produce noticeable improvement in perceptual quality, yet unacceptably low for other video sequences and thus produces noticeably low perceptual quality. As for today's wireless packet data networks (e.g., a high rate packet data (HRPD) type system), there is no fixed or pre-defined traffic rate for VT flow (such as in a WCDMA system). In light of the growing demand for VT and other real-time multimedia services, a need therefore exists for advancing VT and other real-time information encoding in wireless communication systems.

In a wireless packet data network, an encoder (e.g., residing in a wireless communication device such as an access terminal) may be able to infer the current end-to-end traffic channel from the reverse link (RL) traffic channel (which is local information at the access terminal, as further described below), as well as an end-to-end (E2E) feedback signal from the decoder buffer in the receiving decoder. Thus, it would be desirable for the encoder to adapt its encoding rate according to the actual channel performance (e.g., RL traffic channel conditions, end-to-end congestion/delay/loss conditions, etc.) based on the feedback information available, while performing real-time information encoding (e.g., in a manner such that the information arriving at the decoder may be decoded without substantial buffering). Such an approach may allow the frame delay to be effectively controlled, and as a result, improve the quality and efficiency of VT and other real-time information transmission in a wireless environment. (Note, for VT in a wireline environment, the first hop (e.g., from a desktop to the Internet) is typically not the bottleneck, nor does the available bandwidth and condition of the first hop change rapidly with time. Therefore, the local traffic channel information may not be needed in adjusting the VT encoding rate in such an environment.)

Embodiments disclosed herein relate to methods and systems for providing adaptive encoding of real-time information in packet-switched wireless communication systems. In the ensuing description, VT may be used by way of example to illustrate aspects of the invention. Such should not be construed as limiting. Various embodiments and aspects disclosed herein may be applicable to adaptive encoding of any real-time information in wireless communication systems.

An encoder described herein may be associated with (e.g., reside in) a wireless communication device such as an access terminal (AT), configured to encode any real-time information, including (but not limited to) video, audio, gaming, and other real-time (e.g., interactive) data.

An AT described herein may refer to various types of devices, including (but not limited to) a wireless phone, a cellular phone, a laptop computer, a wireless multimedia device, a wireless communication personal computer (PC) card, a personal digital assistant (PDA), an external or internal modem, etc. An AT may be any data device that communicates through a wireless channel and/or through a wired channel (e.g., by way of fiber optic or coaxial cables). An AT may have various names, such as access unit, subscriber unit, mobile station, mobile device, mobile unit, mobile phone, mobile, remote station, remote terminal, remote unit, user device, user equipment, handheld device, etc. Different ATs may be incorporated into a system. ATs may be mobile or stationary, and may be dispersed throughout a communication system. An AT may communicate with an access network (AN) on a forward link (FL) and/or an RL at a given moment.

The FL (or downlink) refers to transmission from the AN to AT. The reverse link (or uplink) refers to transmission from the AT to the AN.

An AN described herein may refer to the network portion of a communication system, and may include (but is not limited to) and/or implements the function of a base station (BS), a base-station transceiver system (BTS), an access point (AP), a modem pool transceiver (MPT), a Node B (e.g., in a WCDMA type system), etc. Further, a cell may refer to a coverage area serviced by an AN. A cell may be divided into one or more sectors.

Various aspects, features, and embodiments are described in further detail below.

Figure 1:
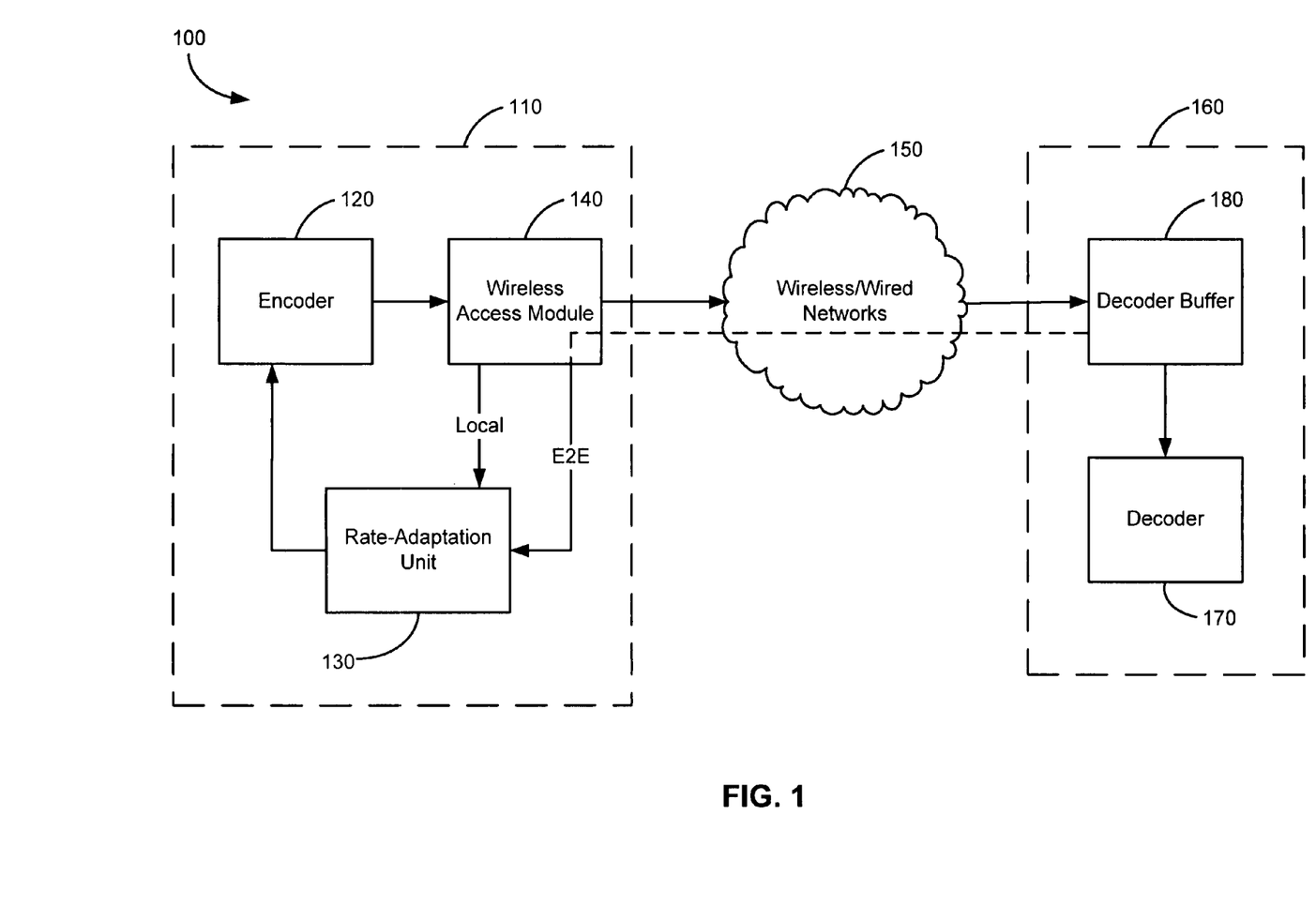
FIG. 1 illustrates an embodiment of a communication system.

FIG. 1 illustrates an embodiment of a communication system 100, in which various embodiments disclosed herein may be implemented. By way of example, an encoder 120, along with a rate-adaptation unit (or module) 130, may reside in an AT 110. Encoder 120 may be configured to have a range of encoding rates. Encoder 120 may access wireless/wired networks 150 via a wireless access module 140 in AT 110. Wired/wireless networks may include one or more ANs, backhaul and core networks, and other network infrastructure. Wireless access module 140 may include, e.g., media access channel (MAC) layer, physical layer, and other means configured to provide access to wireless/wired networks 150. In some embodiments, for example, the physical/MAC layer at wireless access module 140 may be configured to be in communication with an AN in wireless/wired networks 150 and to receive some local feedback information available in the AN. A decoder 170, along with a decoder buffer 180, may reside in another AT 160, configured to decode the encoded data from encoder 120 via wireless/wired networks 150.

In system 100, rate-adaptation unit 130 may be configured to receive feedback information associated with data transmission, which may include "local feedback information" (as illustrated by "Local" in FIG. 1) and "end-to-end feedback information" (as illustrated by "E2E" in FIG. 1), from wireless access module 140, and adapt the real-time information encoding according to such feedback information, as further described below.

The term "local feedback information" disclosed herein may refer to feedback information readily available and without substantial delay at encoder 120 (e.g., provided by wireless access module 140), including (but not limited to) RL data delay (e.g., provided by the physical/MAC layer at wireless access module 140), RL channel condition (e.g., AT's transmit power headroom, estimated channel rate, etc.), RL sector loading status (e.g., associated with the number of transmitters on RL, rise-over-thermal (RoT) measured on RL, etc.), RL physical/MAC layer packet payload (e.g., provided by the physical/MAC layer at wireless access module 140), RL lost packet information (e.g., provided by the physical/MAC layer at wireless access module 140), the amount of data currently buffered in wireless access module 140, etc.

The term "end-to-end feedback information" disclosed herein may refer to feedback information transmitted from a receiver (e.g., decoder 170) back to a sender (e.g., encoder 120), e.g., via wireless/wired networks 150 and wireless access module 140 (such as illustrated by the dashed line in FIG. 1), including (but not limited to) end-to-end data delay, end-to-end jitter, decoder buffer status, core network and backhaul traffic delay, end-to-end missing packet information, etc. The end-to-end feedback information may also take into account FL channel condition (e.g., as reflected by signal-to-noise-plus-interference ratio (SINR) measured on FL), FL sector loading status (e.g., associated with the number of users sharing the scheduler at the AN), etc.

In some embodiments, end-to-end data delay may be determined at decoder 170 and provided to rate-adaptation unit 130, e.g., via wireless/wired networks 150 and wireless access module 140, such as shown in FIG. 1. In other embodiments, end-to-end data delay may be inferred (or estimated) based on the feedback information rate-adaptation unit 130 receives from decoder 170, e.g., via wireless/wired networks 150 and wireless access module 140. The end-to-end feedback information may be carried, e.g., via RTP (real-time transport protocol) Control Protocol (RTCP), embedded in the traffic stream from the receiver to the sender, or via application-defined messages.

In an embodiment, rate-adaptation unit 130 may adapt the encoding rate according to RL data delay. For example, rate-adaptation unit 130 may decrease the encoding rate, if RL data delay is deemed large, e.g., compared with a predetermined threshold (or "delay target"). Rate-adaptation unit 130 may increase the encoding rate (e.g., to improve the quality), if RL data delay is well below the delay target. Consider video encoding as an example. An encoder may adjust its encoding rate by way of a quantization parameter (QP), such as in a MPEG-4, H.263, or H.264 type system. QP indicates the quantization step size for a given frame, which may for example range between $\{1, \ldots, 31\}$. A smaller QP may yield a better video quality and result in a higher frame size for a given frame. In contrast, a larger QP may yield a poorer video quality and result in a smaller frame size. In some embodiments, rate-adaptation unit 130 may use RL data (e.g., frame) delay to adjust the QP value for the next frame based on the current QP value. If RL frame delay incurred is deemed large for decoder buffer 180 (e.g., compared with a delay target), QP may be increased to reduce the next frame size (and hence the future frame delay). Conversely, if RL frame delay is deemed small (e.g., below the delay target), QP may be decreased to improve the video quality, e.g., in a manner that maintains RL frame delay within the delay target.

In an embodiment, rate-adaptation unit 130 may adapt the encoding rate by changing the frequency at which the encoded data may be sent to decoder 170. For example in VT applications, such may include adjusting the encoded video frame rate according to the feedback information.

In some embodiments, rate-adaptation unit 130 may adapt the encoding rate according to RL channel condition, RL sector loading status, etc. Such may allow encoder 120 to react to time-varying events (e.g., sudden changes in AT's transmit power headroom, network congestion, and/or AT 110 being handed off between sectors of different loading) in wireless/wired networks 150, while ensuring that the information still arrives at decoder 170 substantially on time and uninterrupted, and is decoded with sufficient quality. For example, rate-adaptation unit 130 (and/or wireless access module 140) may first determine an estimated channel rate (e.g., the available throughput in the wireless channel) based on RL channel condition, RL sector loading status, and other feedback information, and then adjust the actual encoding rate based on the estimated channel rate.

In an embodiment, rate-adaptation unit 130 may be configured to increase the encoding rate when the sector is lightly loaded, and throttle back the encoding rate when the sector is heavily loaded.

In an embodiment, rate-adaptation unit 130 may adapt the encoding rate according to RL channel condition, e.g., the transmit power headroom of AT 110. Such may allow an AT with limited power (e.g., with limited power headroom, or situated at the edge of its sector) to carry on real-time information encoding (e.g., VT applications) at an acceptable quality level by lowering the encoding rate.

In an embodiment, rate-adaptation unit 130 may adapt the encoding rate according to RL physical layer packet payload and/or MAC layer packet payload. For example, the encoder may encode the information at an encoding rate that is compatible with (e.g., smaller than) RL physical/MAC layer packet payload.

In an embodiment, rate-adaptation unit 130 may adapt the encoding rate according to end-to-end feedback information (e.g., end-to-end data delay), which may be provided by decoder 170 along with decoder buffer 180 via wireless/wired networks 150 (such as illustrated in FIG. 1). For example, in the event that AT 110 is in a poor FL condition or in a highly-loaded FL sector, rate-adaptation unit 130 may reduce the encoding rate, so as to lighten the sector loading and ensure that the information still arrives at decoder 170 substantially on time and uninterrupted and is decoded with sufficient quality. In the event that AT 110 is in a good end-to-end condition, rate-adaptation unit 130 may increase the encoding rate, thereby providing better overall quality while still meeting delay requirements.

In VT applications, for example, missing video frames or delayed video frame arrival may be indicative of the current encoding rate being too large. In such events, QP may be adjusted accordingly, e.g., increased to reduce the frame size. In some embodiments, the end-to-end feedback information may also be used to adjust the set thresholds in rate-adaptation control schemes, as further described below.

Figure 2:
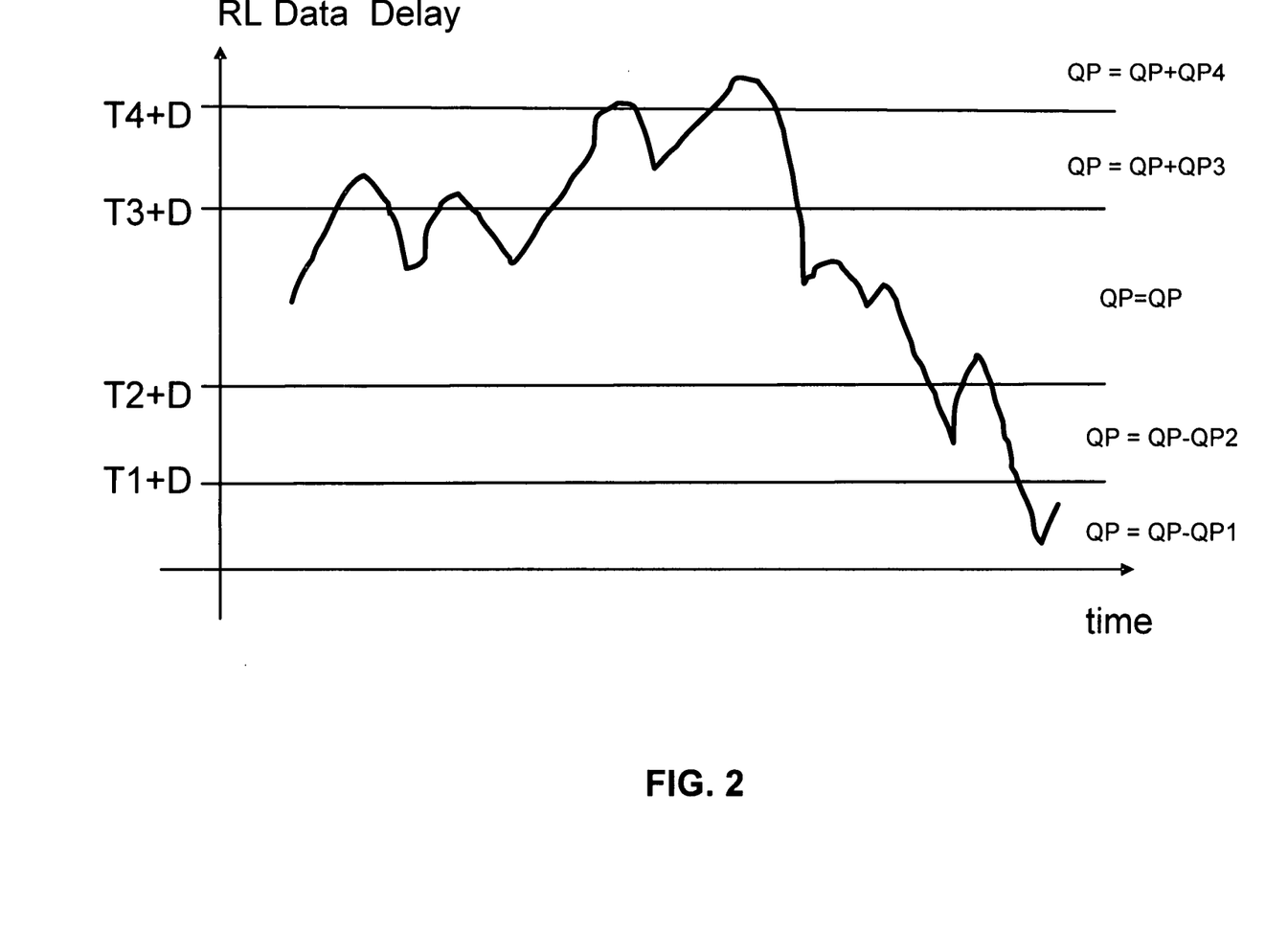
FIG. 2 depicts an embodiment of a rate-adaptation scheme, as illustrated by a plot of reverse link data delay as a function of time.

FIG. 2 depicts an embodiment of a rate-adaptation control scheme, where a plot of RL data delay as a function of time for a VT application is illustrated by way of example. RL data (e.g., frame) delay may be measured (or estimated) based on local feedback information available at wireless access module 140 and provided to rate-adaptation module 130, such as illustrated in FIG. 1. One or more set thresholds, e.g., denoted as (Ti+D), i=1, 2, 3, 4, may be used to adjust RL data delay, where the parameter D may be representative of the effect of end-to-end data (e.g., frame) delay, as further described below. For example, if RL data delay at some instance exceeds a particularly threshold, e.g., between (T3+D) and (T4+D), QP may be adjusted, e.g., increased to (QP+QP3) to reduce the delay. If RL data delay at another instance falls below another threshold, e.g., between (T1+D) and (T2+D), QP may also be adjusted, e.g., decreased to (QP−QP2) to provide a better quality.

Figure 3:
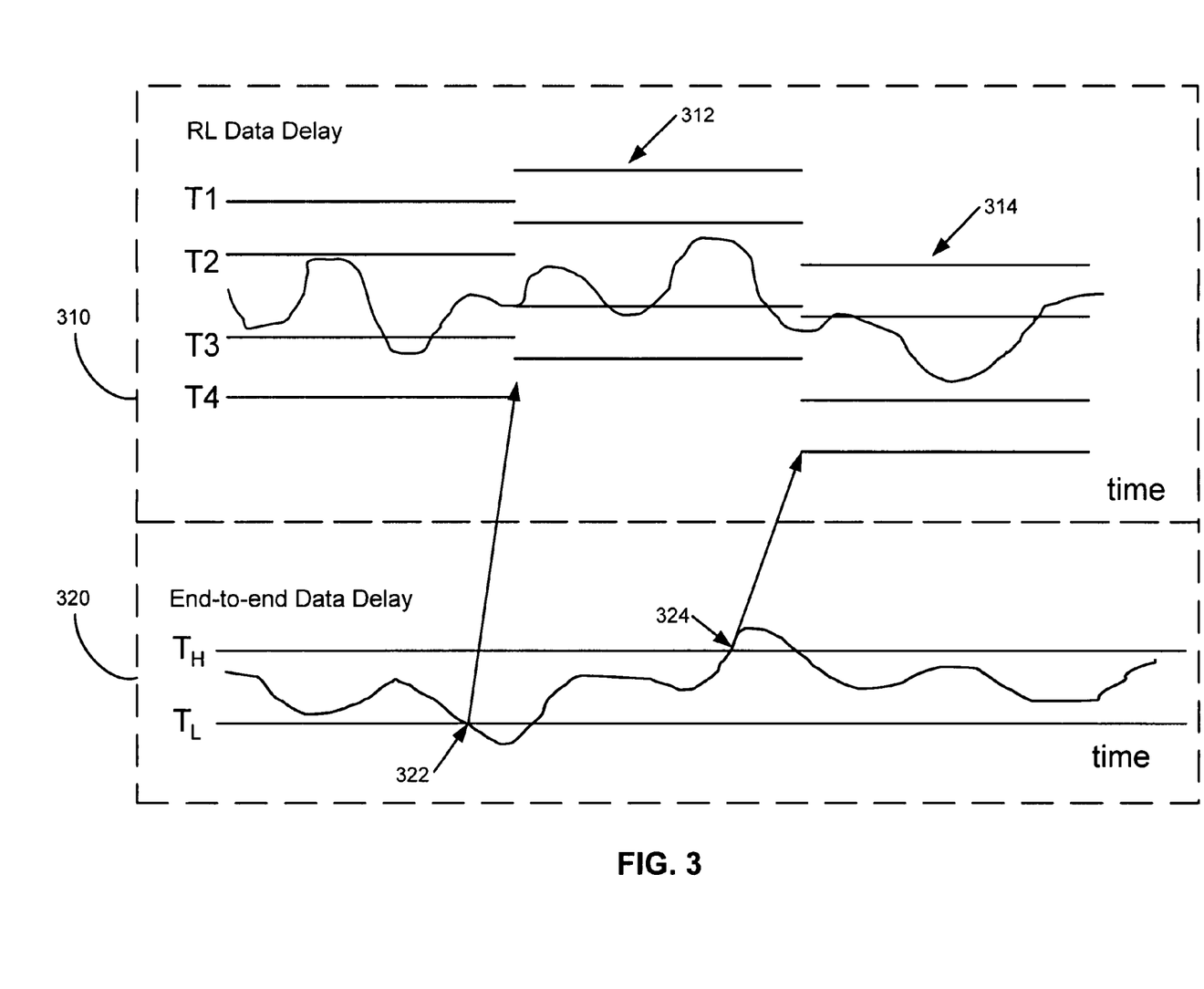
FIG. 3 illustrates an embodiment of adaptively adjusting set thresholds in a rate-adaptation scheme based on end-to-end data delay.

FIG. 3 illustrates an embodiment of how the end-to-end delay information may be used to adjust the set thresholds in a rate-adaptation control scheme (such as in the embodiment of FIG. 2). By way of example, box 310 illustrates RL data delay as a function of time, which may be determined (e.g., measured or estimated) at wireless access module 140 and provided to rate-adaptation unit 130 (such as illustrated in FIG. 1). Box 320 illustrates end-to-end data delay as a function of time, which rate-adaptation unit 130 may also receive from wireless access module 140 (such as described above). As illustrated in the figure, if end-to-end data delay falls below a lower threshold $T_L$ (e.g., at point 322), the set thresholds (Ti, i=1, 2, 3, 4) in box 310 may be increased, as section 312 illustrates (which may be equivalent to including a larger D in the set thresholds, such as shown in FIG. 2). If end-to-end data delay exceeds an upper threshold $T_H$ (e.g., at point 324), the set thresholds (Ti, i=1, 2, 3, 4) in box 310 may be decreased, as section 314 illustrates (which may be equivalent to including a smaller D in the set threshold, such as shown in FIG. 2).

Figure 4:
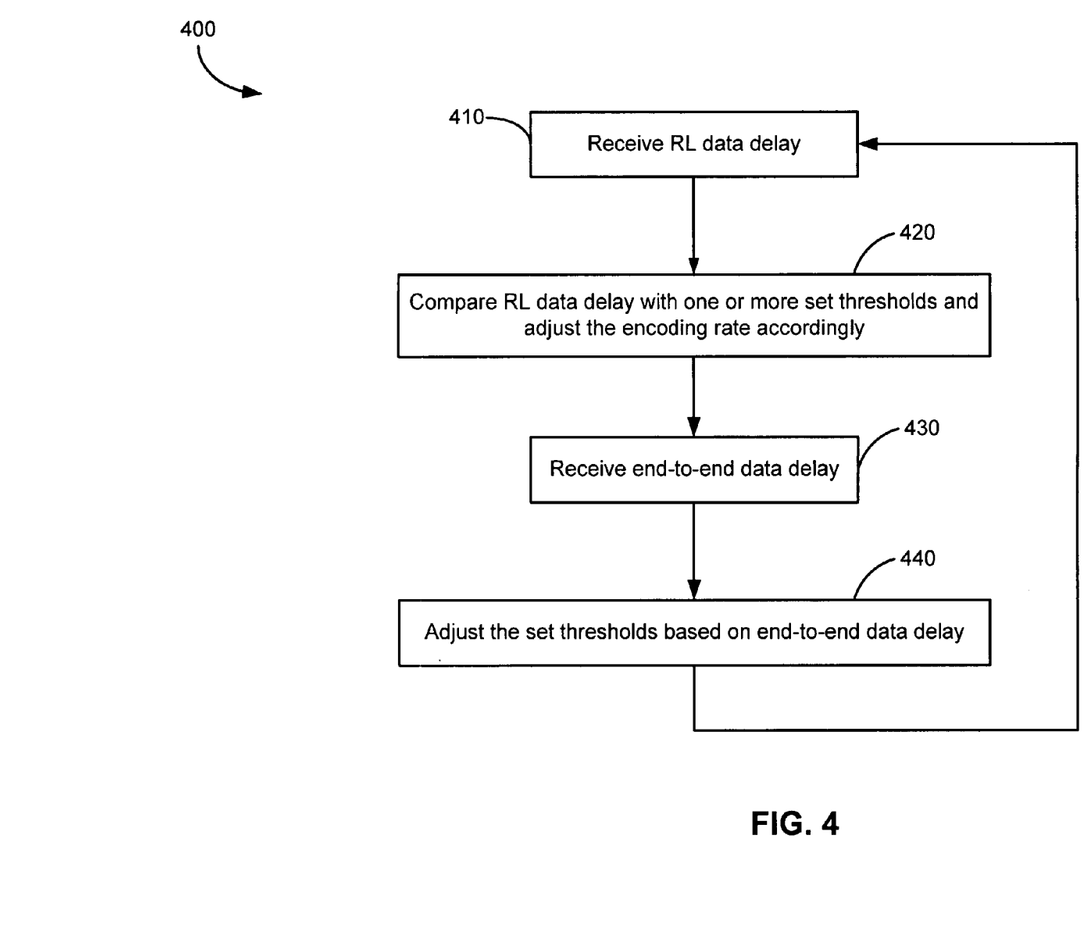
FIG. 4 illustrates a flow diagram of a process, which may be used to implement some disclosed embodiments.

FIG. 4 illustrates a flow diagram of a process 400, which may be used to implement some disclosed embodiments. Step 410 receives RL data delay (e.g., from wireless access module 140). Step 420 compares RL data delay with one or more set thresholds and adjusts an encoding rate accordingly. Step 430 receives end-to-end data delay (e.g., from wireless access module 140). Step 440 adjusts the set thresholds based on the received end-to-end data delay. Subsequently, process 400 returns to step 410.

Figure 5:
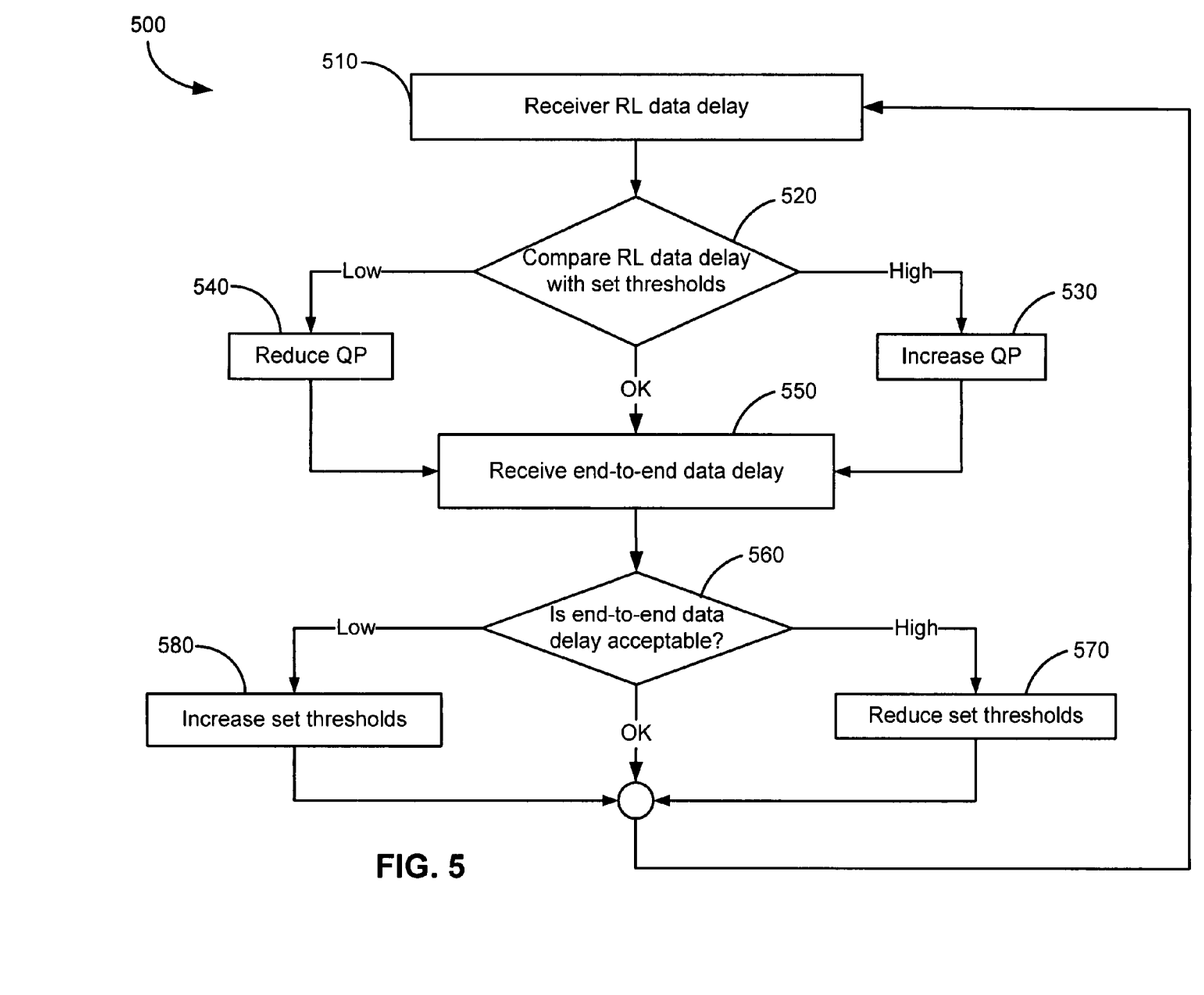
FIG. 5 illustrates a flow diagram of a process, which may be used to implement some disclosed embodiments.

FIG. 5 illustrates a flow diagram of a process 500, which may be used to implement some disclosed embodiments, e.g., process 400 of FIG. 4 in a VT application. Step 510 receives RL data delay (e.g., from wireless access module 140). Step 520 compares RL data delay with one or more set thresholds. If RL data delay is deemed high (e.g., in reference to a predetermined threshold, such as illustrated in FIG. 2), step 530 follows and increases QP. If RL data delay is deemed low, on the other hand, step 540 follows and decreases QP. Alternatively, if RL data delay is deemed acceptable (or "OK"), no adjustment needs to be made. Subsequently, step 550 follows and receives end-to-end data delay. Step 560 then determines if end-to-end data delay is acceptable (e.g., in reference to some predetermined thresholds, such as illustrated in FIG. 3). If end-to-end data delay is deemed high, step 570 follows and reduces the set thresholds (such as illustrated in FIG. 3). If end-to-end data delay is deemed low, step 580 follows and increases the set thresholds (such as illustrated in FIG. 3). Alternatively, if end-to-end data delay is deemed acceptable (or "OK"), no adjustment needs to be made. Process 500 subsequently returns to step 510.

In some embodiments (such as illustrated in FIGS. 2-5 above), a rate-adaptation control scheme may be implemented by employing two control loops, e.g., including a fast (or inner) loop associated with RL data delay and a slow (or outer) loop associated with the end-to-end data delay (such as schematically illustrated in FIG. 1). Such a two-loop approach may effectively make use of both the small delay provided by local feedback information and the large delay provided by end-to-end feedback information. (In the latter case, there may also be additional time needed to estimate the end-to-end behavior.) In an embodiment, the two control-loops may be configured to allow the encoder/decoder system to adapt its performance according to a desired tradeoff between delay and quality. For example, data delay may be used as the "target measure" (hence quality being subject to it) for the control scheme in some situations; while quality may be used as the target measure (hence data delay being subject to it) for the control scheme in other situations.

In other embodiments, a rate-adaptation control scheme may make use of a single control loop, e.g., based on RL data delay, end-to-end data delay, or other types of feedback information (such as described above). Other rate-adaptation schemes may also be implemented. The rate-adaptation schemes thus described may be utilized to control the encoding of any real-time information.

Figure 6:
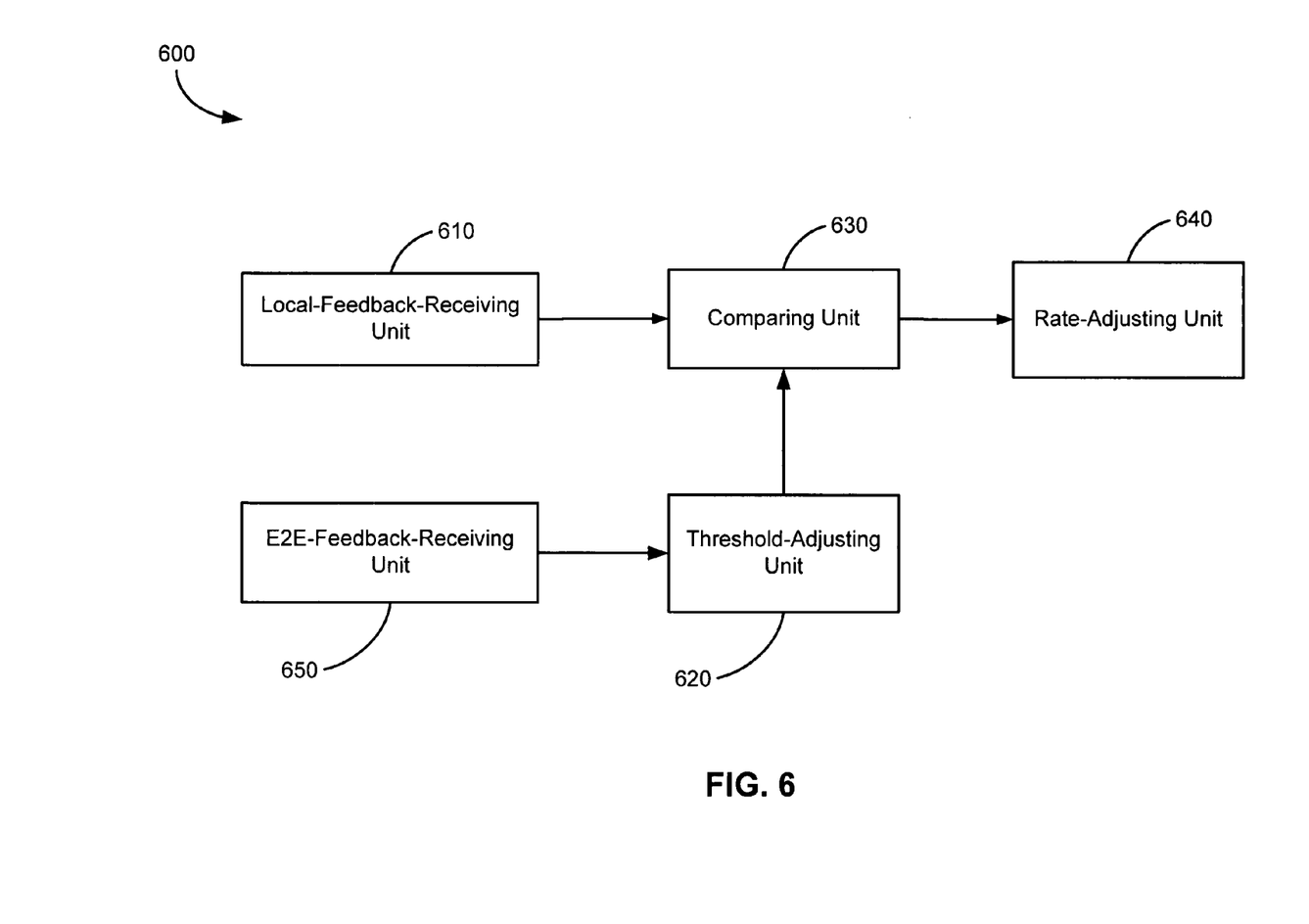
FIG. 6 illustrates a block diagram of an apparatus, in which some disclosed embodiments may be implemented.

FIG. 6 illustrates a block diagram of an apparatus 600, in which some disclosed embodiments may be implemented. Apparatus 600 may include local-feedback-receiving unit (or module) 610 configured to receive RL data delay and other local feedback information (e.g., from wireless access module 140); a threshold-adjusting unit 620 configured to generate and/or adjust one or more set thresholds; a comparing unit 630 configured to compare the target measure (e.g., RL data delay) with the set thresholds provided by threshold-adjustment unit 620; and a rate-adjusting unit 640 configured to adjust the encoding rate (e.g., by way of QP or frame rate as in VT applications) based on the output from comparing unit 630. Apparatus 600 may further include an E2E-feedback-receiving unit 650, configured to receive end-to-end feedback information (e.g., from wireless access module 140) and provide it to threshold unit 620. Threshold unit 620 may further adjust the set thresholds based on end-to-end feedback information (such as described above).

Figure 7A:
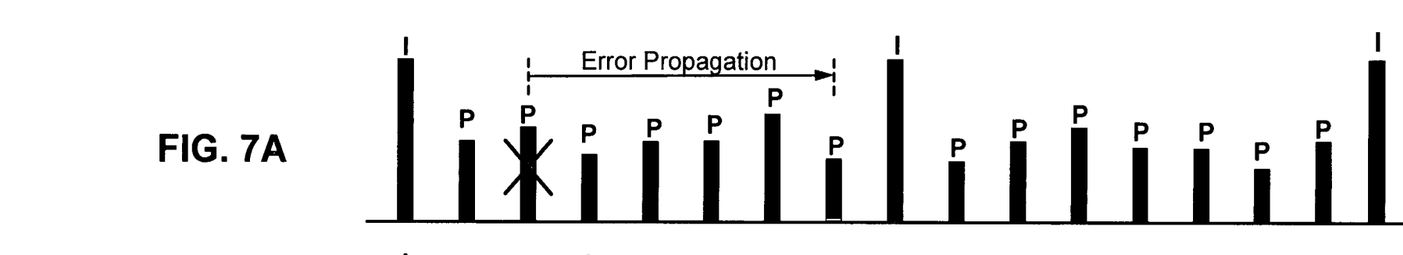
FIGS. 7A-7C illustrate embodiments of adaptively selecting the encoding frame type based on lost packet information.
Figure 7B:
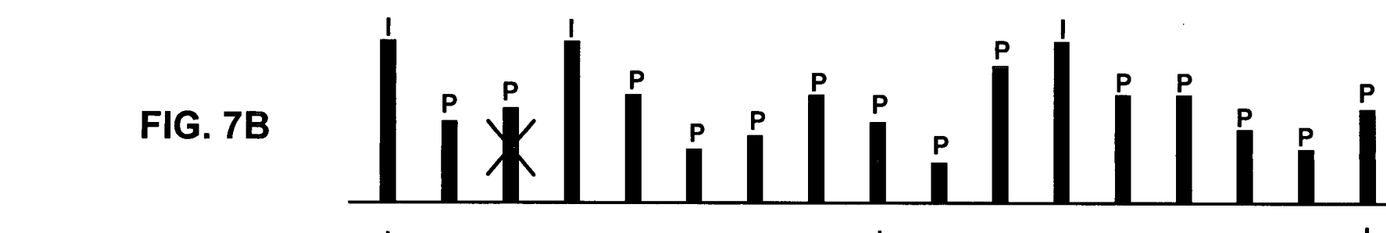
Figure 7C:
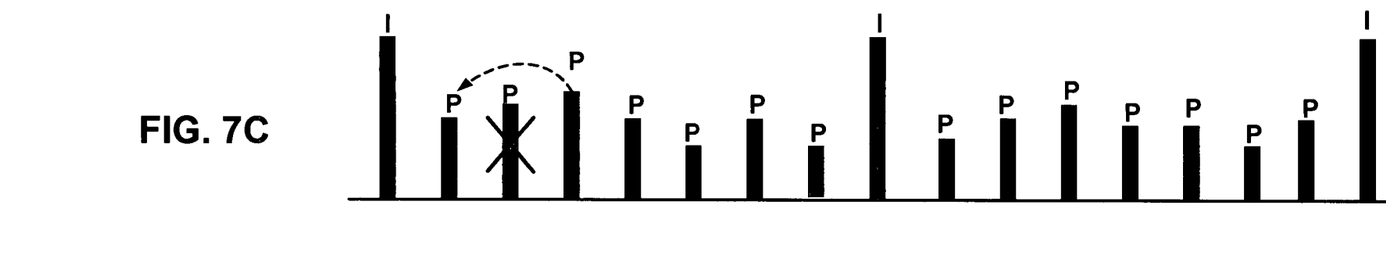

In some situations, it may be desirable to use RL lost packet information (e.g., provided locally by way of RL physical layer automatic repeat request (ARQ), RL hybrid ARQ, and/or RLMAC-ARQ) to determine the next unit of the information to be encoded, e.g., a frame type for a subsequent frame to be encoded in a VT application. By way of example, FIGS. 7A-7C illustrate embodiments of adaptively selecting the encoding frame type based on RL lost packet information. In VT applications, because of the decoding dependency for Predicted frames (or P-frames), a lost I-frame or P-frame causes propagating errors for the subsequent P-frames, such as illustrated in FIG. 7A. In such an event, if the encoder continues sending the remaining P-frames with reference to the missing frame until the end of Group-of-Picture (GOP), the visual quality of the remaining frames may be significantly degraded. Thus, by making use of local feedback information regarding the lost frames, the encoder may encode the next frame as an I-frame to interrupt the propagation of errors, as illustrated in FIG. 7B. The encoder may encode the next frame as a new P frame whose reference frame is the latest successful transmitted frame, as illustrated in FIG. 7C.

Figure 8:
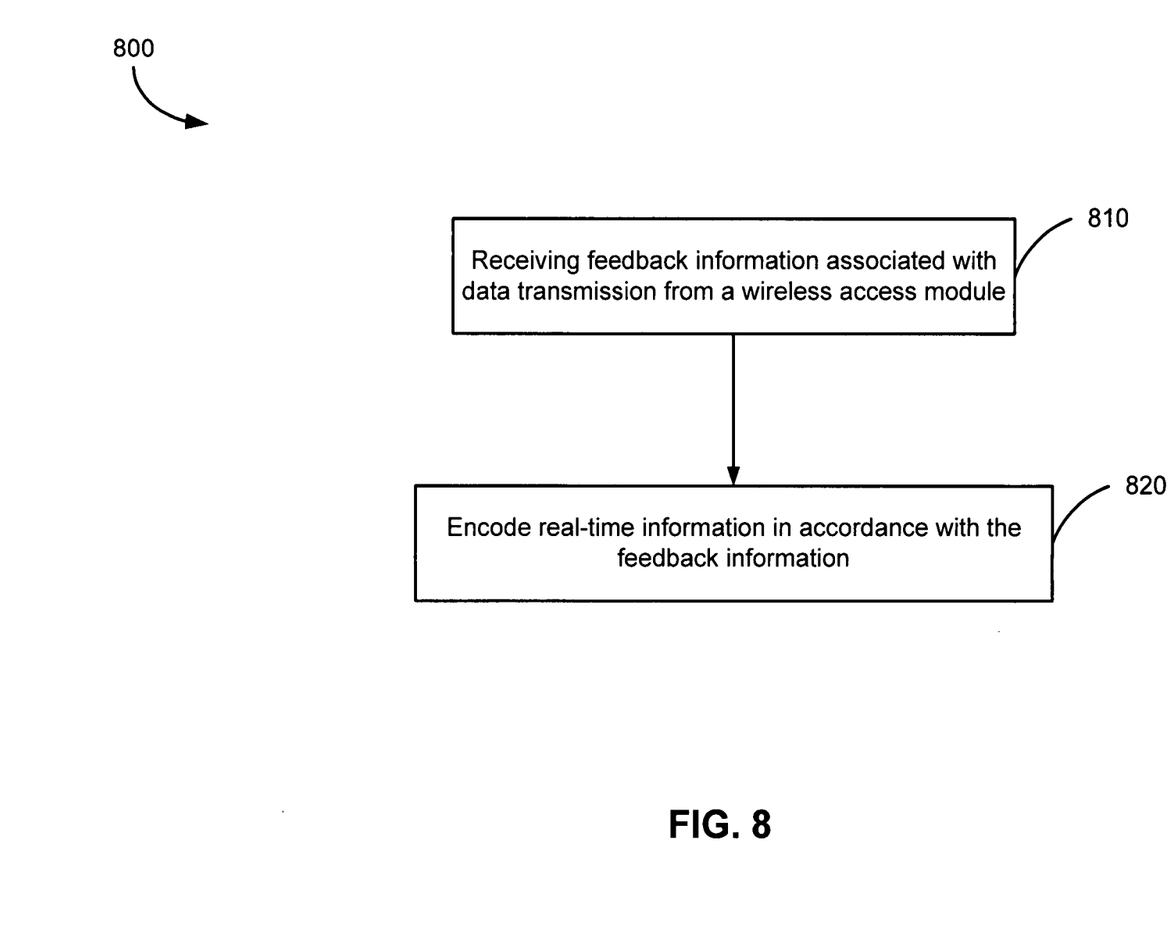
FIG. 8 illustrates a flow diagram of a process, which may be used to implement some disclosed embodiments.

FIG. 8 illustrates a flow diagram of a process 800, which may be used to implement some disclosed embodiments. Step 810 receives feedback information associated with data transmission from a wireless access module. Step 820 encodes real-time information in accordance with the received feedback information.

In process 800, step 820 may further include adapting an encoding rate in accordance with the feedback information and encode the real-time information at the encoding rate (such as described above). Step 820 may also include determining the next unit of the information to be encoded (e.g., selecting a frame type for a subsequent frame to be encoded as in VT applications) in accordance with the feedback information (such as illustrated in FIGS. 7A-7C).

Embodiments disclosed herein provide some embodiments of adaptive encoding of real-time information in packet-switched wireless communication systems. There are other embodiments and implementations.

Various units/modules described herein may be implemented in hardware, software, firmware, or a combination thereof. In a hardware implementation, various units may be implemented within one or more application specific integrated circuits (ASIC), digital signal processors (DSP), digital signal processing devices (DSPDs), field programmable gate arrays (FPGA), processors, microprocessors, controllers, microcontrollers, programmable logic devices (PLD), other electronic units, or any combination thereof. In a software implementation, various units may be implemented with modules (e.g., procedures, functions, and so on) that perform the functions described herein. The software codes may be stored in a memory unit and executed by a processor (or a processing unit). The memory unit may be implemented within the processor or external to the processor, in which case it can be communicatively coupled to the processor via various means known in the art.

Various disclosed embodiments may be implemented in an AT, and other means configured to encode real-time information.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in an AT. In the alternative, the processor and the storage medium may reside as discrete components in an AT.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An access terminal apparatus for real-time information encoding in wireless communications, comprising:
   a rate-adaptation unit configured to:
      receive feedback information associated with data transmission from a wireless access module in a wireless communication network, wherein the feedback information comprises local feedback information and end-to-end data delay;
  determine if the end-to-end data delay is below a first threshold, and if so, increase at least one set threshold of a plurality of set thresholds;
  determine if the end-to-end data delay is above a second threshold, and if so, decrease at least one set threshold of the plurality of set thresholds; and
  determine reverse link data delay from the local feedback information; and
an encoder configured to encode real-time information in accordance with the reverse link data delay and the plurality of set thresholds.

2. The access terminal apparatus of claim 1, wherein the encoder configured to encode real-time information in accordance with the reverse link data delay and the plurality of set thresholds comprises the encoder configured to:
  determine if the reverse link data delay is below at least one set threshold of the plurality of set thresholds, and if so, adjust an encoding rate downward; and
  determine if the reverse link data delay is above at least one set threshold of the plurality of set thresholds, and if so, adjust the encoding rate upward.

3. The access terminal apparatus of claim 2, wherein the encoding rate is adjusted by way of a quantization parameter.

4. The access terminal apparatus of claim 1, wherein the encoder is further configured to determine a unit of the real-time information to be encoded, based in part on the feedback information.

5. The access terminal apparatus of claim 4, wherein the local feedback information is associated with reverse link lost packet information.

6. The access terminal apparatus of claim 4, wherein the encoder is further configured to select a type for a subsequent frame to be encoded.

7. The access terminal apparatus of claim 6, wherein the frame type includes one of an I-type frame and a P-type frame, and a reference frame associated with a P-type frame.

8. The access terminal apparatus of claim 1, wherein the local feedback information includes reverse link channel condition.

9. The access terminal apparatus of claim 8, wherein the reverse link channel condition includes at least one of transmit power headroom and estimated channel rate associated with the access terminal.

10. The access terminal apparatus of claim 1, wherein the local feedback information includes reverse link sector loading status.

11. The access terminal apparatus of claim 1, wherein the local feedback information includes at least one of reverse link physical layer packet payload and reverse link MAC layer packet payload.

12. The access terminal apparatus of claim 1, wherein the local feedback information is associated with an amount of data buffered in the wireless access module.

13. The access terminal apparatus of claim 1, further comprising the wireless access module configured to be in communication with the wireless communication network.

14. An access terminal apparatus for real-time information encoding in wireless communications, comprising:
  means for receiving feedback information associated with data transmission from a wireless access module in a wireless communication network, wherein the feedback information comprises local feedback information and end-to-end data delay;
  means for determining if the end-to-end data delay is below a first threshold, and if so, increasing at least one set threshold of a plurality of set thresholds;
  means for determining if the end-to-end data delay is above a second threshold, and if so, decreasing at least one set threshold of the plurality of set thresholds;
  means for determining reverse link data delay from the local feedback information; and
  means for encoding real-time information in accordance with the reverse link data delay and the plurality of set thresholds.

15. The access terminal apparatus of claim 14, wherein the means for encoding real-time information in accordance with the reverse link data delay and the plurality of set thresholds comprises:
  means for determining if the reverse link data delay is below at least one set threshold of the plurality of set thresholds, and if so, adjusting an encoding rate downward; and
  means for determining if the reverse link data delay is above at least one set threshold of the plurality of set thresholds, and if so, adjusting the encoding rate upward.

16. The access terminal apparatus of claim 15, wherein the encoding rate is adjusted by way of a quantization parameter.

17. The access terminal apparatus of claim 14, wherein the means for encoding is further configured to determine a unit of the real-time information to be encoded, based in part on the feedback information.

18. The access terminal apparatus of claim 17, wherein the means for encoding is further configured to select a type for a subsequent frame to be encoded.

19. A method for real-time information encoding in wireless communications, comprising:
  receiving at an access terminal feedback information associated with data transmission from a wireless access module in a wireless communication network, wherein the feedback information comprises local feedback information and end-to-end data delay;
  determining if the end-to-end data delay is below a first threshold, and if so, increasing at least one set threshold of a plurality of set thresholds;
  determining if the end-to-end data delay is above a second threshold, and if so, decreasing at least one set threshold of the plurality of set thresholds;
  determining reverse link data delay from the local feedback information; and
  encoding real-time information in accordance with the reverse link data delay and the plurality of set thresholds.

20. The method of claim 19, wherein encoding real-time information in accordance with the reverse link data delay and the plurality of set thresholds comprises:
  determining if the reverse link data delay is below at least one set threshold of the plurality of set thresholds, and if so, adjusting an encoding rate downward; and
  determining if the reverse link data delay is above at least one set threshold of the plurality of set thresholds, and if so, adjusting the encoding rate upward.

21. The method of claim 20, further comprising adjusting the encoding rate by way of a quantization parameter.

22. The method of claim 19, wherein the encoding real-time information includes determining a unit of the real-time information to be encoded, based in part on the feedback information.

23. The method of claim 22, further comprising selecting a frame type for a subsequent frame to be encoded.

24. The method of claim 22, wherein the local feedback information is associated with reverse link lost packet information.

25. The method of claim 19, wherein the local feedback information includes reverse link channel condition.

26. The method of claim 25, wherein the reverse link channel condition includes at least one of available transmit power and estimated channel rate associated with the access terminal.

27. The method of claim 19, wherein the local feedback information includes reverse link sector loading status.

28. The method of claim 19, wherein the local feedback information is associated with an amount of data buffered in the wireless access module.

29. A method for real-time information encoding, comprising:
- receiving reverse link data delay at a wireless communication device;
- receiving end-to-end data delay;
- determining if the end-to-end data delay is below a first threshold, and if so, increasing at least one set threshold of a plurality of set thresholds;
- determining if the end-to-end data delay is above a second threshold, and if so, decreasing at least one set threshold of the plurality of set thresholds;
- comparing the reverse link data delay with the plurality of set thresholds at the wireless communication device; and
- adjusting an encoding rate in accordance with the comparison at the wireless communication device.

30. The method of claim 29, wherein the encoding rate is adjusted by way of a frame rate.

31. The method of claim 29, wherein the encoding rate is adjusted by way of a quantization parameter.

32. An apparatus for real-time information encoding, comprising:
- means for receiving reverse link data delay;
- means for receiving end-to-end data delay;
- means for determining if the end-to-end data delay is below a first threshold, and if so, increasing at least one set threshold of a plurality of set thresholds;
- means for determining if the end-to-end data delay is above a second threshold, and if so, decreasing at least one set threshold of the plurality of set thresholds;
- means for comparing the reverse link data delay with the plurality of set thresholds; and
- means for adjusting an encoding rate in accordance with the comparison.

33. The apparatus of claim 32, wherein the encoding rate is adjusted by way of at least one of a quantization parameter and a frame rate.

34. The method of claim 29, wherein adjusting the encoding rate in accordance with the comparison comprises:
- determining if the reverse link data delay is below at least one set threshold of the plurality of set thresholds, and if so, adjusting an encoding rate at the wireless communication device downward; and
- determining if the reverse link data delay is above at least one set threshold of the plurality of set thresholds, and if so, adjusting the encoding rate at the wireless communication device upward.

35. The apparatus of claim 32, wherein the means for adjusting the encoding rate in accordance with the comparison comprises:
- means for determining if the reverse link data delay is below at least one set threshold of the plurality of set thresholds, and if so, adjusting an encoding rate at the apparatus downward; and
- means for determining if the reverse link data delay is above at least one set threshold of the plurality of set thresholds, and if so, adjusting the encoding rate at the apparatus upward.

* * * * *